United States Patent [19]

Mohlenkamp et al.

[11] Patent Number: 5,445,263
[45] Date of Patent: Aug. 29, 1995

[54] GASKET CONTAINER AND ASSEMBLY TOOL

[75] Inventors: Michael J. Mohlenkamp, University Heights; Gerald A. Babuder; Peter A. Jobling, both of Mentor; Charles E. Conover, Middlefield, all of Ohio

[73] Assignee: Cajon Company, Macedonia, Ohio

[21] Appl. No.: 306,270

[22] Filed: Sep. 14, 1994

[51] Int. Cl.⁶ .................................................. B65D 85/02
[52] U.S. Cl. ....................................... 206/303; 206/445; 206/564
[58] Field of Search ............... 206/303, 445, 372, 373, 206/564, 339; 81/302; 294/16

[56] References Cited

U.S. PATENT DOCUMENTS

| | | |
|---|---|---|
| 676,490 | 6/1901 | DePuy . |
| 1,057,763 | 4/1913 | Mueller et al. . |
| 1,420,729 | 6/1922 | Moran et al. . |
| 3,191,791 | 6/1965 | Jackson . |
| 3,759,377 | 9/1973 | Weimer .................................. 206/303 |
| 3,773,169 | 11/1973 | Zahuranec et al. ............. 206/303 X |
| 3,923,156 | 12/1975 | Wallestad . |
| 4,091,919 | 5/1978 | MacLeod et al. . |
| 4,172,523 | 10/1979 | Weglage . |
| 4,495,689 | 1/1985 | McNeal et al. . |
| 4,541,528 | 9/1985 | Holmes . |
| 4,796,756 | 1/1989 | Ott . |
| 4,799,588 | 1/1989 | Trisl .................................. 206/564 X |
| 5,046,611 | 9/1991 | Oh .................................... 206/339 |
| 5,062,191 | 11/1991 | Carr ................................... 81/302 X |
| 5,114,014 | 5/1992 | Ascalon et al. . |
| 5,226,230 | 7/1993 | Klinger . |
| 5,279,416 | 1/1994 | Malec et al. ..................... 206/339 |

*Primary Examiner*—Jacob K. Ackun
*Attorney, Agent, or Firm*—Fay, Sharpe, Beall, Fagan, Minnich & McKee

[57] ABSTRACT

A special container and a cooperating plier-type tool are designed to facilitate storage and installation of fluid system gaskets. The container acts to guide and control movement of the tool into gripping engagement with the gaskets to eliminate contact with the sealing faces of the gaskets by either the installer's hands or the tool.

13 Claims, 4 Drawing Sheets

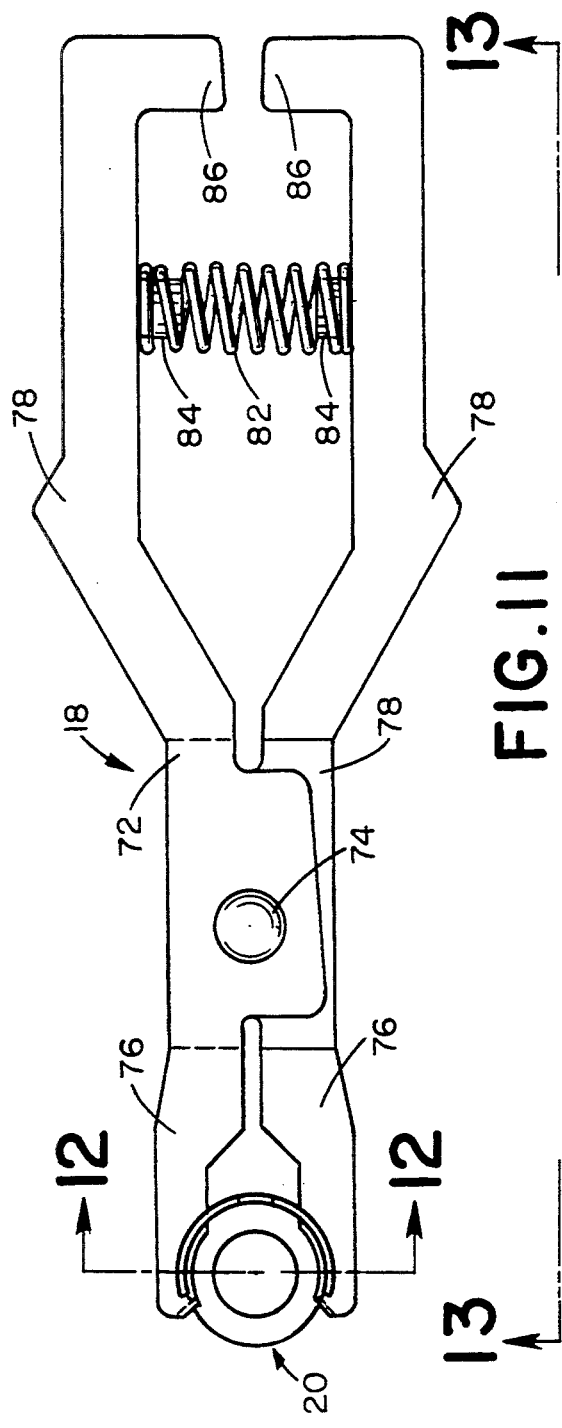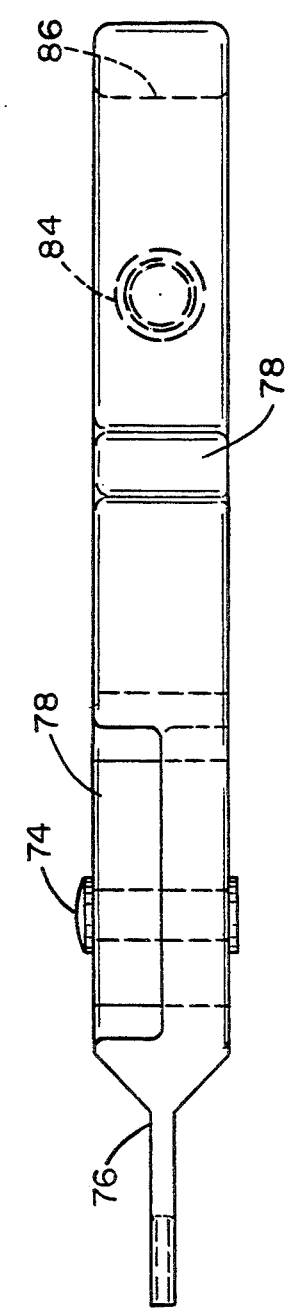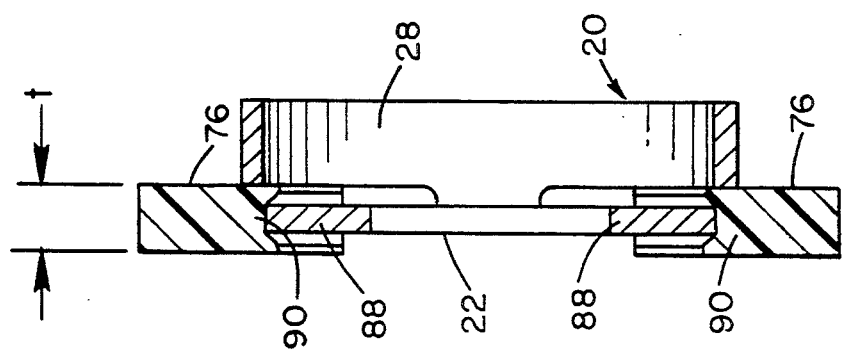

GASKET CONTAINER AND ASSEMBLY TOOL

BACKGROUND OF THE INVENTION

The subject invention is directed toward the art of pipe joints and couplings and, more particularly, to a gasket container and a cooperating tool for facilitating use and installation of gaskets.

In the commonly assigned copending application Ser. No. 08/187,096, filed Jan. 26, 1994, for "Fluid Coupling With Gasket Retainer" there is disclosed a tube coupling with an improved gasket having an integral retainer arrangement that allows the gaskets to be removed from and replaced into position between aligned sealing faces of the associated coupling components with the coupling components in a closely spaced and aligned relationship nearly in their final, located position. The arrangement greatly facilitates gasket removal and replacement since disassembly of the associated pipe or tubing system is not required.

The couplings of the type under consideration use opposed, bead-type seal surfaces that engage opposite faces of an interposed thin metal gasket. The coupling seal surfaces and the gasket faces are highly polished and require careful handling since they are very sensitive to scratches, foreign substances, and the like. The presence of any such defects or impurities can result in a leak.

The recently developed gasket with the integral retainer as described in the above-noted application offers distinct advantages. Most notably, as noted earlier, the gaskets can be installed or removed and replaced with the coupling components separated only to the point of disengaging the gasket faces.

SUMMARY OF THE INVENTION

The subject invention provides a gasket container and installation tool which facilitates storage, handling, and installation of the gaskets. The invention allows installation of the gaskets without touching them with the installer's hands at any time between removal from the storage container through final installation. In particular, and in accordance with a first aspect of the invention, there is provided a container having a plurality of upwardly open slots formed therein and supporting disk-like gasket members with opposed seal faces joined by a relatively narrow peripheral edge. The slots include a portion only slightly wider than the peripheral edge of the gasket members to support the gasket members in a position with diametrically opposed portions of the peripheral edges exposed. Associated with the container is a manually operable gripping tool having opposed jaws selectively movable toward and away from one another and having contoured portions to allow gripping engagement of the exposed diametrically opposed portions of the peripheral edges of the gaskets without engagement of the jaws with the opposed seal faces. Spaced guide surfaces are formed in the container in association with the slots for engaging the jaws of the gripping tool and guiding the contoured portions of the jaws into engagement with the exposed diametrically opposed portions of the edges. Preferably, and in accordance with a more limited aspect of the invention, the jaws have a thickness only slightly less than the width of the guide portions of slots and the contoured portions comprise V-shaped groove to center the gasket edges within the jaws.

In accordance with a further aspect of the invention, the guide surfaces are desirably in the container and extend parallel to the slots. It is preferred that the guide surfaces be formed in pairs so as to engage opposite sides of the gripping jaws to produce an automatic centering of the jaws relative to the gaskets.

In the preferred embodiment of the invention, the container includes a plastic tray-like member and the slots have a narrow central portion which locates and centers the gasket. Wider end portions on the slots define the spaced guide surfaces for guiding the jaws into engagement with the gaskets.

In accordance with yet still more limited aspect of the invention, the slots are located in parallel and in aligned rows. The slots include associated recesses for receiving laterally extending retainer members formed integrally with the gaskets. Preferably, the associated recesses are sized and located to hold the gaskets in position in the slots by engagement of the recess walls with the retainer. Also, the gaskets are held in an orientation proper for removal and subsequent installation using the preferred gripping tool.

In its preferred form, the container includes a cover which is slidably received on the tray-like member to closely overlie the gaskets and the gasket receiving slots to prevent significant vertical shifting of the gaskets in the slots.

In accordance with yet another aspect of the invention, the guide surfaces are spaced apart a distance substantially equal to the thickness of the opposed jaws so that the jaws are maintained closely centered and located relative to the respective gasket located in the associated slot.

Preferably, the length of the slots is related to the jaws such that the jaws are not only centered relative to the gaskets in an axial direction but also in a diametrical direction.

As can be seen from the foregoing, a primary object of the invention is the provision of a gasket container and inserting tool that allows ready extraction of a gasket from the storage container in position for installation in the associated tube fitting without manually contacting the gasket.

A further object of the invention is the provision of a container assembly of the type described wherein the gaskets are supported and located in a manner to prevent contact and damage to the sealing surfaces of the gasket.

Still another object of the invention is the provision of a gasket container and tool combination of the type described wherein movement of the gasket installing tool into the container automatically centers and locates the tool relative to the gasket and positions the gasket relative to the tool in the manner required for installation of the gasket subsequent to its removal from the storage container.

Still another object of the invention is the provision of an apparatus of the type described which is relatively simple and easy to use.

Still other advantages and benefits of the invention will become apparent to those skilled in the art upon a reading and understanding of the following detailed description.

BRIEF DESCRIPTION OF THE DRAWINGS

The above and other objects and advantages will become apparent from the following description when read in conjunction with the accompanying drawings wherein:

FIG. 11 is a side elevational view of the gasket inserting tool shown in FIG. 1 (the tool is shown gripping a gasket);

FIG. 12 is a view taken on lines 12—12 of FIG. 11; and,

FIG. 13 is a side view taken on lines 13—13 of FIG. 11.

DETAILED DESCRIPTION OF THE PREFERRED EMBODIMENT

Figure 2:
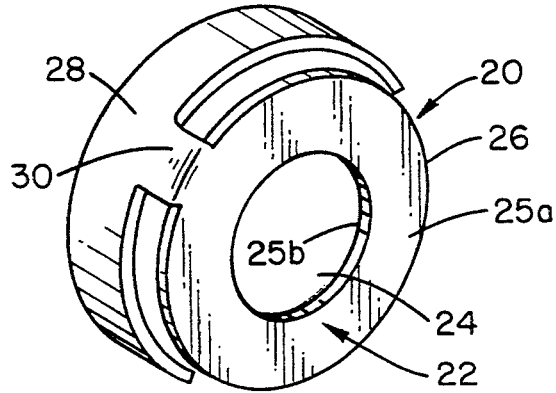
FIG. 2 is a perspective view of a preferred gasket embodiment of the type intended to be stored in the container of FIG. 1.
Figure 1:
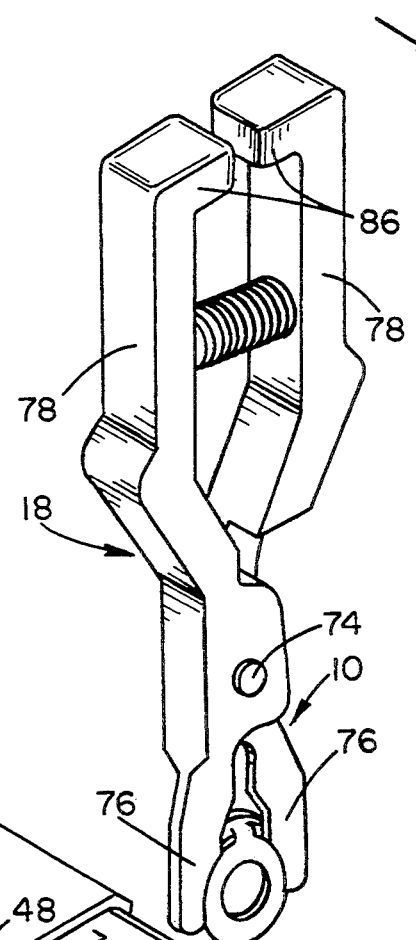
FIG. 1 is a perspective view illustrating a gasket storage container and an associated gasket installing tool in the process of removing a gasket from the container.
Figure 1:
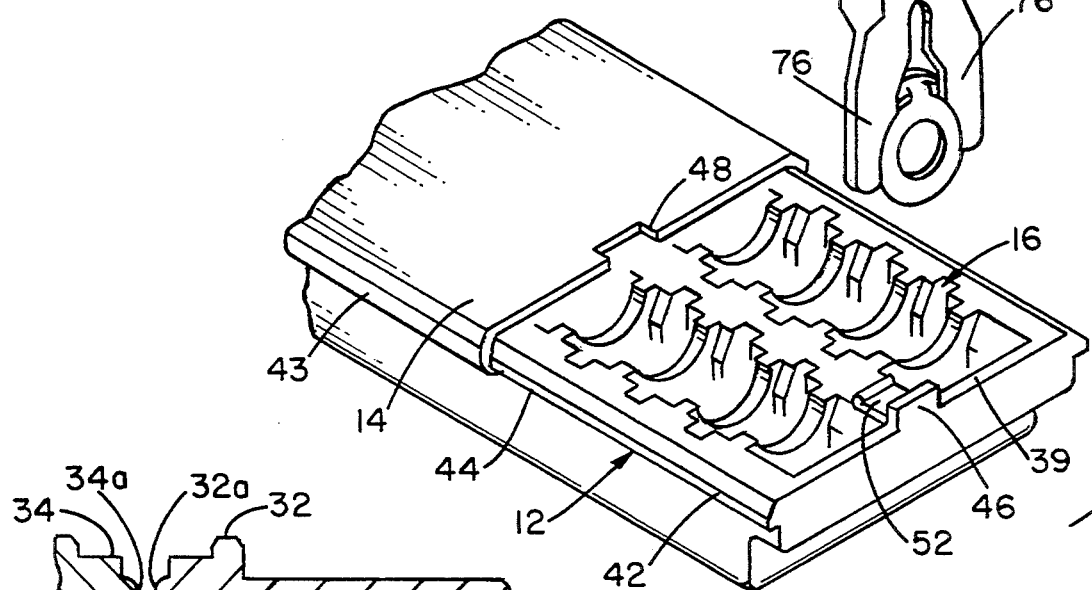
Figure 3:
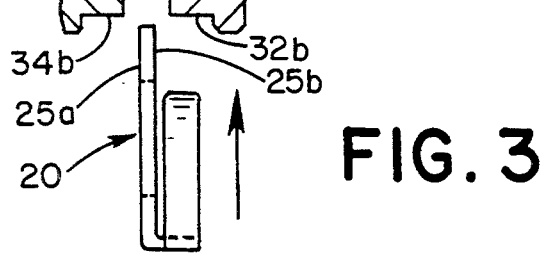
FIG. 3 is a partial cross-sectional view somewhat diagrammatic, showing the gasket of FIG. 2 being installed between a pair of aligned tube coupling components.
Figure 4:
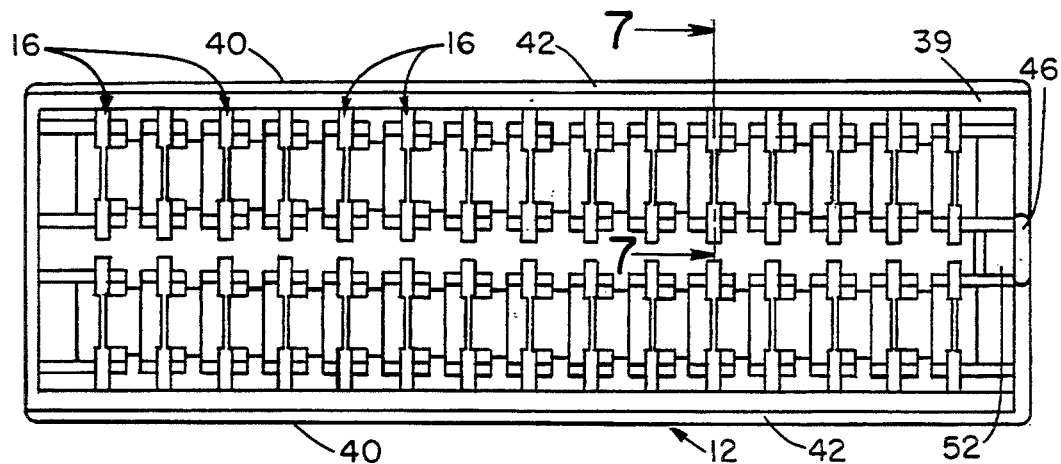
FIG. 4 is a top plan view of the preferred form of container with the cover removed.
Figure 5:
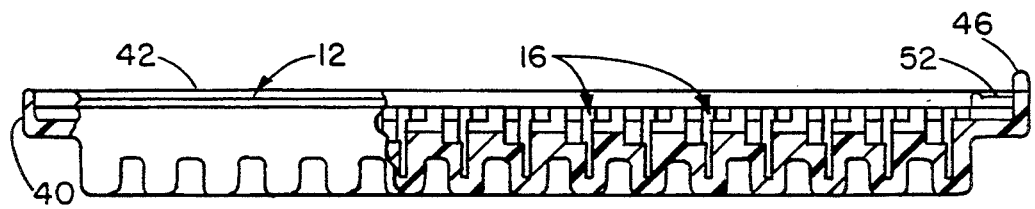
FIG. 5 is an elevational view of the container of FIG. 4 (portions have been broken away to more clearly show the internal gasket receiving slot configurations)
Figure 6:
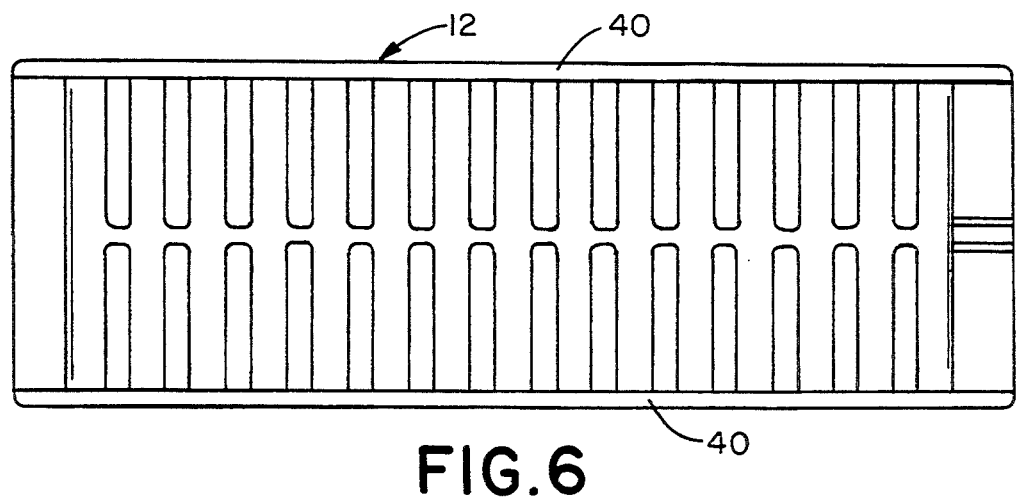
FIG. 6 is a bottom plan view of the container shown in FIG. 4.

Referring now to the drawings wherein the showings are for the purposes of illustrating the preferred embodiment of the invention only and not for purposes of limiting same, FIG. 1 is a perspective view illustrating a gasket storage container 10 comprising a tray-like base member 12 and an associated slide cover 14. The gasket container 10 in its preferred construction will subsequently be described in great detail but, for the present, it should generally be noted that the gasket container and, in particular, the tray-like base portion 12 includes a plurality of upwardly open, parallel slot and recess arrangements 16 which are designed to receive and hold individual gasket members in a vertically aligned position for engagement by and removal from the tray through the use of the gripping tool indicated generally with the reference numeral Before proceeding with a detailed description of the container 10 and the associated tool 18, it appears advisable to briefly review the particular preferred form of gasket for which the assembly is intended to be used. In particular, while the invention could be used with many types of gaskets, either with or without associated retainers, the gasket in the preferred embodiment is of the type generally described and claimed in the commonly assigned copending application Ser. No. 08/187,096, which was filed Jan. 26, 1994, for "Fluid Coupling With Gasket Retainer." The disclosure of the noted application is herein incorporated by reference. For the present purposes, the gasket, in its preferred form, is illustrated in perspective in FIG. 2. In general, the gasket is identified with the numeral 20 and includes an annular disk-like body 22 having a central through passage 24 and opposed seal faces 25a and 25b. The disk-like body 22 has an outer periphery 26 and an associated retainer element that is connected thereto by an integral web-like joining section 30. The retainer section 28 is, in this preferred embodiment, resilient and of semi-cylindrical form. It is sized so as to allow it to grip a cylindrical surface on an associated tube coupling component and maintain the annular disk-like seal gasket portion 22 properly aligned with the coupling faces. This general relationship is shown in FIG. 3 wherein opposed coupling components 32 and 34 are illustrated with a gasket assembly 20 of the type shown in FIG. 2 preparatory to moving into position between the opposed seal faces 32a and 34a of the coupling components. This type of coupling assembly is generally well known and is shown in prior U.S. Pat. Nos. 4,552,389 and 5,145,219.

In the subject gasket embodiment, the integral retainer portion 28 is arranged to grip about an annular end portion 32b or 34b on the coupling components. When properly sized relative to the coupling components and engaged therewith, the opposed sealing faces of the annular gasket body 22 are aligned with the seal faces 32a and 34b, and the associated clamping nuts of the coupling (not shown) can be tightened to cause the seal surfaces 32a and 34a to sealingly engage the gasket faces.

As described in the aforementioned prior patent application, the advantage of this particular design of gasket and retainer is that gaskets can be installed and replaced between the seal faces of the coupling components without moving the coupling components a significant axial distance apart as was required by prior gasket and retainer combinations.

With this particular type of gasket and coupling arrangement, it is quite critical that the seal faces 32a and 34a, as well as the opposed sealing faces of the gasket, be treated with care to avoid scratching or even fingerprints under certain conditions.

As discussed earlier, the subject gasket storage container allows the gaskets to be maintained in a position for ready access by the installer through the use of a tool which extracts the gaskets from the container and can be used to install them without necessity of touching the gasket seal faces with either the tool or the operator's hands. Referring in particular to FIGS. 1, 4, 5, and 6, the arrangement of the preferred form for the gasket container 10 can best be understood. As illustrated, the tray-like base portion 12 of the container 10 comprises the previously-mentioned array of aligned parallel slot assemblies 16 which, in the preferred form, are arranged in two aligned rows to store the gaskets 20 in side-by-side parallel relationship. The tray-like base member 12 is preferably formed as an injection molded plastic component and includes the slot assemblies 16 molded to extend downwardly therein from the top 39. Each lateral side 40 of the tray-like base member 12 is provided with an outwardly extending flange portion 42 that is tapered on its top surface as best seen in FIG. 10.

An elongated slide cover 14 shown in FIG. 1 is also preferably molded of plastic and is provided with downwardly extending lateral sides 43 terminating in an inwardly extending flange portion 44 that is sized to engage under the flange 42 on the tray-like base member 12. The left end of the cover also includes a downwardly extending end wall 45.

Figure 10:
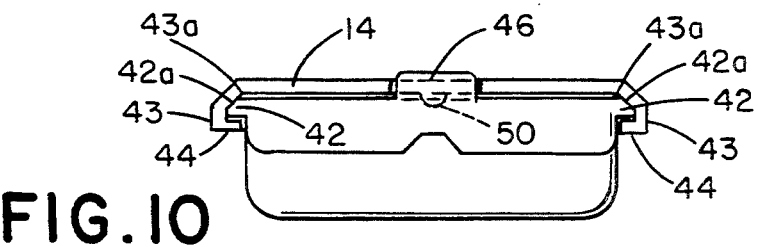
FIG. 10 is an end view of the container of FIG. 9 (the view is taken on lines 10—10 of FIG. 9)

As can be seen in FIG. 10, flange 42 includes inclined upper lateral surfaces 42a. Corresponding, inclined mating surfaces 43a are carried on lateral sides 43. The size relationship between lateral sides 43 and flanges 42 is such as to assure that the cover is entirely supported by the inclined surfaces 42a and 43a and no contact takes place between the flat underside of the cover 14 and the top surface of the base member 12. This assures that any particles produced by wear between the lid and the base member are on the inclined surfaces where there is significantly less likelihood of being deposited into the container to contaminate the gaskets.

Figure 9:
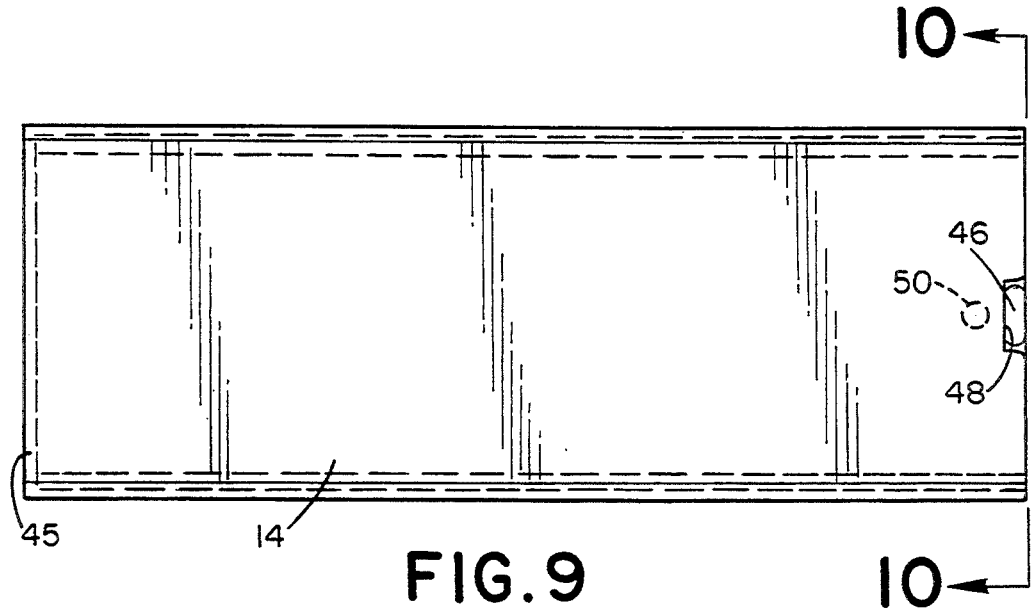
FIG. 9 is a top plan view of the gasket container of FIG. 4 with the slide cover in position.

FIG. 9 shows the cover 14 in its closed position over the base 12. In this position, there is an upwardly extending stop member 46 formed at the end of the base 12 that is engaged in a recess 48 formed in the right-hand end (as viewed in FIG. 9) of the cover 14. A downwardly extending latch bead 50 is formed on the underside of the cover 14 at the location seen in FIG. 9. This bead is arranged to enter into a recess 52 (see FIGS. 4 and 5) and resiliently engage therein to retain the cover in its closed position until a substantial force is applied to move the cover to the left as viewed in FIG. 9 to move it to an open position as shown in FIG. 1.

Figure 7:
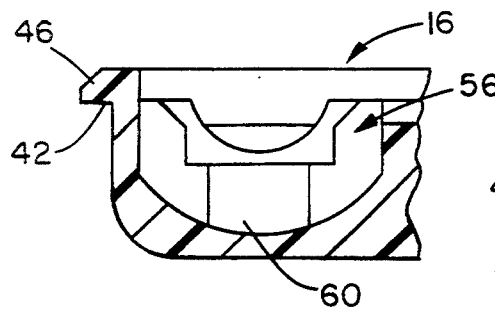
FIG. 7 is a cross-sectional view taken on lines 7—7 of FIG. 4.

Of particular importance to the subject invention is the shape and arrangement of the previously-mentioned slot assemblies 16. These slot assemblies are best seen and understood by reference to FIGS. 7 and 8. As illustrated therein, each of the slot assemblies includes a central main slot portion 56 that extends downwardly from the interior top surface 58. The central slot 56 has a total lateral width W which is significantly greater than the maximum diameter of the gaskets 20. In addition, the width of the slots identified with $W_1$ is also significantly greater than the thickness of the annular gasket portion 22. At the bottom of each of the main slots 56, there is a narrow inwardly extending portion 60 that preferably enters from both sides of the slot to an opposed spacing that is only slightly greater than the thickness of the annular gasket body 22 to engage on lateral sides thereof and position the gasket in vertical alignment centrally of the main slot 56. The remaining portions of the gaskets are, however, spaced from the sidewalls of the main slot 56. At one side of the main slot 56, there is a recess 62 that extends laterally and is sized so as to receive the retainer portion 28 of the gasket 20. The gasket is shown in phantom in FIG. 8 so that the annular body 22 of the gasket 20 can be seen relative to its associated retainer As thus illustrated in FIG. 8, the retainer portion is centrally located in the recess 62 and is closely received therein to maintain the annular gasket and its seal surfaces centered relative to the main slot portions 56 and the end walls of the slot which are spaced a distance W as previously described. The annular portion of the gasket is thus positioned with the edges in vertical alignment and spaced from the sidewalls and end walls of the main slot 56. The gasket is, however, properly stored and positioned in the base 12 and is located relative to the top 14 such that when the top is in a closed position, the gasket is retained to prevent vertical dislodgement from the main storage slot 56.

The tool member 18 is best seen in FIGS. 1 and 11 through 13. As previously-mentioned, this gripping type tool member is arranged so that it is movable into the slot 56 for gripping engagement of the periphery of the annular portion 22 of the gasket 20. In particular, it will be noted that the preferred form of tool comprises a plier like assembly including opposed identical halves 70 and 72 which are pivotally connected by a pivot pin 74. Each of the members 70, 72 include a jaw end portion 76 and an associated handle portion 78. The handles are biased apart to cause the jaw portion 76 to be biased toward one another. In this embodiment, the biasing is achieved through the use of a coil spring 82 that is suitably mounted between extensions 84 formed on the interior of the handles 78. The outer or right-hand end of the handle 78 preferably include inwardly directed stops 86 that are located and arranged to limit the maximum opening of the jaws 76 in a manner subsequently to be described.

Figure 8:
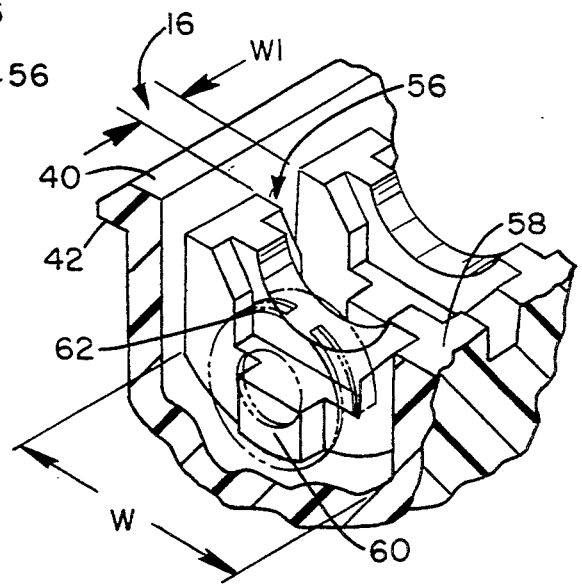
FIG. 8 is a perspective view looking into one of the gasket receiving slots of the container.

Of particular importance to the tool 18 is the arrangement of the jaws 76 and their design in relationship to the gasket 20 and the container 10. In the preferred form, the jaws 76 have a thickness T which is only slightly less than the spacing $W_1$ of the main slot opening 56 as illustrated in FIG. 8. Thus, the Jaws can enter and be guided by the sidewalls 56 of the slot. In addition, the jaws include an inner gripping surface or face 88 that has a generally V-shaped configuration as best seen in FIG. 12. Also, the jaws are contoured in their side view as seen in FIG. 11 to generally conform to the spherical outer surface of the annular portion 22 of gasket 20. The V-shaped contour illustrated in FIG. 12 terminates in a transverse bottom wall 90 that is sized so as to allow the peripheral edge of the annular portion 22 of gasket 20 to seat therein. The width or thickness t of the jaws 76 is such that when they are engaged with the periphery 26 of the annular gasket portion 22, they enter between the side of the retainer 28 and the gasket portion 22 as seen in FIG. 12. The maximum open width, of the Jaws as defined or limited by the previously-mentioned portions 86 is such that it cannot grip over the retainer portion of the gasket. Also, this maximum width is slightly less than the maximum dimension W of each slot 56 as illustrated in FIG. 8. Thus, the tool when gripped by the user and moved to its maximum open position is, in effect, guided by the side and end walls of each slot 56 to position it ideally relative to the gasket portion 22. A slight release to allow the handles and the jaws to move toward the closed position thus engages and grips the gasket in the jaws and the gasket can be removed from the tray portion 12 of the container 10. It is also located relative to the jaws in a position for installation directly into its sealing relationship with the coupling components as illustrated in FIG. 3. The arrangement thus assures that the gasket itself can be removed and installed into the coupling without being engaged improperly or without any possible scratching or damage to the seal faces.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. In combination:

a container having a plurality of upwardly open slots formed therein and supporting disk-like gasket members with opposed seal faces joined by a relatively narrow peripheral edge, the slots being only slightly wider than the peripheral edge of the gasket members to support the gasket members in a position with diametrically opposed portions of the peripheral edges exposed;

a manually operable gripping tool having opposed jaws selectively movable toward and away from one another and having contoured portions to allow gripping engagement of the exposed diametrically opposed portions of the peripheral edges of the gaskets without engagement of the jaws with the opposed seal faces; and, spaced guide surfaces formed in the container in association with the slots for engaging the jaws of the gripping tool and guiding the contoured portions of the jaws into engagement with the exposed diametrically opposed portions of the edges.

2. The combination of claim 1 wherein the jaws have a thickness only slightly less than the width of the slots and wherein the contoured portions comprise V-shaped grooves.

3. The combination of claim 1 wherein the guide surfaces are spaced apart a distance substantially equal to the thickness of the opposed jaws.

4. The combination of claim 1 wherein the guide surfaces are in pairs and extend parallel to the slots.

5. The combination of claim 4 wherein the pairs of guide surfaces are parallel to each other and located on each side of the slots.

6. The combination of claim 1 wherein the container comprises a plastic tray-like member and the slots have a narrow central portion and wider end portions, the wider end portions defining the spaced guide surfaces.

7. The combination of claim 6 wherein the container includes a cover that is slidably received on the tray.

8. The combination as defined in claim 6 wherein the gripping tool has a pair of opposed jaws with each jaw having a thickness adapted to enter a respective wider end portion of the slots.

9. In combination:

a container formed of plastic and having an upwardly facing surface with a plurality of closely spaced upwardly open parallel slots formed therein and supporting annular disk-like gasket members with opposed seal faces joined by a relatively narrow peripheral edge and each gasket having a C-shaped retainer joined thereto, the slots having a central portion being only slightly wider than the peripheral edge of the gasket members to support the gasket members in a position with diametrically opposed portions of the peripheral edges exposed and the respective C-shaped retainers facing toward the upwardly facing surface;

a manually operable gripping tool having opposed narrow jaws selectively movable toward and away from one another, the jaws having V-shaped contoured portions located centrally between lateral sides of the jaws to allow gripping engagement of the exposed diametrically opposed portions of the peripheral edges of the gaskets without engagement of the jaws with the opposed seal faces; and, spaced guide surfaces formed in the container in association with the slots for engaging the lateral sides of the jaws of the gripping tool and guiding the V-shaped contoured portions of the jaws into engagement with the exposed diametrically opposed portions of the edges to allow removal of the gasket members from the container.

10. The combination of claim 9 wherein the slots have end portions that define the spaced guide surfaces.

11. The combination of claim 10 wherein the guide surfaces are spaced apart a distance substantially equal to the thickness of the opposed jaws.

12. A container for holding annular disk-like gaskets comprising:

a tray-like body molded of plastic and having a top surface and a body surface with a plurality of slots extending downwardly into the body from the top surface;

the slots having spaced sidewalls and an open outer upper end with a closed lower end, the lower ends of the slots having centrally located portions extending inwardly of the sidewalls to form a narrow inner groove at the lower end of the slots;

a laterally extending recess adjacent each slot at the open outer end; and, a cover slidably mounted to the top of the tray-like body.

13. The container as defined in claim 12 wherein the recesses are above the narrow inner grooves.

* * * * *